US009749342B1

(12) United States Patent
Krage et al.

(10) Patent No.: US 9,749,342 B1
(45) Date of Patent: Aug. 29, 2017

(54) SYSTEM AND METHOD FOR DETECTING UNAUTHORIZED DEVICE ACCESS BY COMPARING MULTIPLE INDEPENDENT SPATIAL-TIME DATA SETS FROM OTHER DEVICES

(71) Applicant: The United States of America, as represented by the Administrator of the National Aeronautics and Space Administration, Washington, DC (US)

(72) Inventors: Frederick J. Krage, Bowie, MD (US); Paul A. Westmeyer, Woodbridge, VA (US); Russell F. Wertenberg, Belmont, CA (US); Jack F. Riegel, Alexandria, VA (US)

(73) Assignee: The United States of America, as represented by the Administrator of the National Aeronautics and Space Administration, Washington, DC (US)

( * ) Notice: Subject to any disclaimer, the term of this patent is extended or adjusted under 35 U.S.C. 154(b) by 43 days.

(21) Appl. No.: 15/281,988

(22) Filed: Sep. 30, 2016

Related U.S. Application Data (63) Continuation of application No. 14/501,430, filed on Sep. 30, 2014, now abandoned.

(51) Int. Cl.
*H04L 29/06* (2006.01)
(52) U.S. Cl.
CPC ......... *H04L 63/1425* (2013.01); *H04L 63/10* (2013.01); *H04L 63/1416* (2013.01)

(58) Field of Classification Search
CPC ................... H04L 63/10; H04L 63/1416
See application file for complete search history.

(56) References Cited

U.S. PATENT DOCUMENTS

| | | | | |
|---|---|---|---|---|
| 6,751,562 B1* | 6/2004 | Blackett | ............ | G05B 19/4185 340/635 |
| 7,330,796 B2* | 2/2008 | Addink | ................... | E03B 7/071 702/44 |
| 8,316,524 B1* | 11/2012 | LeMieux | ................. | B21J 15/10 29/524.1 |
| 9,158,650 B2* | 10/2015 | Akirekadu | .......... | G06F 11/3495 |
| 2003/0204756 A1* | 10/2003 | Ransom | ................. | G01D 4/004 713/300 |
| 2004/0138834 A1* | 7/2004 | Blackett | ................. | G06Q 50/06 702/62 |
| 2005/0144437 A1* | 6/2005 | Ransom | .................... | G06F 1/28 713/151 |
| 2006/0009928 A1* | 1/2006 | Addink | ................... | E03B 7/071 702/50 |
| 2007/0002139 A1* | 1/2007 | Benson | .............. | G05B 13/0275 348/143 |
| 2009/0199296 A1* | 8/2009 | Xie | ........................ | G06F 21/316 726/23 |
| 2011/0202961 A1* | 8/2011 | Asano | ................ | G08B 21/0423 725/46 |
| 2012/0063641 A1* | 3/2012 | Venkatesh | .......... | G06K 9/00771 382/103 |

(Continued)

*Primary Examiner* — Ali Shayanfar (57) ABSTRACT

An authentication procedure utilizes multiple independent sources of data to determine whether usage of a device, such as a desktop computer, is authorized. When a comparison indicates an anomaly from the base-line usage data, the system, provides a notice that access of the first device is not authorized.

15 Claims, 4 Drawing Sheets

(56) References Cited

U.S. PATENT DOCUMENTS

| | | | |
|---|---|---|---|
| 2013/0117556 A1* | 5/2013 | Coleman | H04L 9/0827 713/154 |
| 2013/0132854 A1* | 5/2013 | Raleigh | G06F 3/0482 715/738 |
| 2014/0075464 A1* | 3/2014 | McCrea | G06F 19/3418 725/14 |
| 2014/0089243 A1* | 3/2014 | Oppenheimer | G06F 21/50 706/46 |
| 2014/0113588 A1* | 4/2014 | Chekina | G06F 21/552 455/410 |
| 2014/0189808 A1* | 7/2014 | Mahaffey | H04L 63/0853 726/4 |
| 2014/0277798 A1* | 9/2014 | Haga | G08B 21/0484 700/291 |
| 2016/0061687 A1* | 3/2016 | Srivastava | G01M 5/0033 73/786 |
| 2016/0065428 A1* | 3/2016 | Srivastava | H04L 43/065 370/242 |

* cited by examiner

SYSTEM AND METHOD FOR DETECTING UNAUTHORIZED DEVICE ACCESS BY COMPARING MULTIPLE INDEPENDENT SPATIAL-TIME DATA SETS FROM OTHER DEVICES

ORIGIN OF THE INVENTION

The invention described herein was made by an employee of the United States Government and may be manufactured and used by or for the Government of the United States of America for governmental purposes without the payment of any royalties thereon or therefor.

BACKGROUND

1. Technical Field

The present disclosure relates to authentication by a system, and more specifically, to a system and method of authenticating a user or usage of a first device by comparing usage of the first device with other usage data from at least one other device that transmits data on an independent data path from a data path associated with the first device.

2. Introduction

A common challenge in complex computer systems is the identification of anomalous activity, such as unauthorized access or use of a device. A common scenario is an unauthorized party attempting to nefariously exploit an authorized party's access to a system. Further, unauthorized use of the device can be from an authorized user who is doing inappropriate things once the authorized user gains access. Some approaches have developed to address this challenge, including multi-factor authentication, use of mobile devices to validate access, geo-location of the source access location, performance monitoring, and monitoring a data stream from the device in question for unauthorized activity. Some of the current state-of-art security features rely upon hardware tokens, cookies, geo-location, and passwords. Geo-location capabilities in devices are commonly available, making use of Global Positioning System (GPS) receivers, cellular network tower triangulation, or other means. These capabilities are sufficient to locate the device to within 10 m or less when GPS is used, and at 50 m with nominal triangulation from cell towers. This level or granularity is sufficient to establish a reasonable probability of the device being present in a defined geographic area, such as a work location, or home. Cell tower density is effectively coupled to cell phone/smartphone density, and in many metropolitan settings, the cell tower-based geo-location is approaching satellite-based GPS performance.

However, there still exists a need for improved detection of inappropriate use or unauthorized access to a device. Sophisticated attackers can change data or files on a device and fool detection systems. The prior strategies have not been able to adequately capture inappropriate access or use. For example, a sophisticated attacker can alter internal files on a device, such as a computer, such that reliance on data from the device regarding its usage may not enable a detection system to detect the unauthorized use. What is needed is an improved ability to identify when a device has been inappropriately accessed or used.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An authentication procedure utilizes multiple independent sources of data to determine whether access to or usage of a device, such as a desktop computer, is authorized. The procedure includes gathering data from usage patterns or other data associated with at least two devices such as a computer and a mobile phone, as well as optionally data from an independent source such as, for example, a facility access mechanism, lighting data, or an accelerometer on a keyboard, door or chair. This list is not meant to be overly narrowing and other sources of data could be provided as well. The method includes identifying anomalous device use behavior by receiving three types of data from three sources: (1) first data from a first device, such as a desktop computer, via a first data path, the first device normally being accessed by a user; (2) second data from a second device, such as a mobile phone, associated with the user via a second data path; and (3) optionally third data from a third data source via a third data path, the third data source being, for example, an environment sensor. When a comparison indicates an anomaly from the base-line usage data, the system provides a notice that access of the first device is not authorized.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

A system, method, and computer-readable storage devices are disclosed, which address the issue raised above regarding an improved detection of unauthorized access to a device. An authentication procedure utilizes multiple independent sources of data to determine whether usage of a device, such as a desktop computer, is authorized. A method embodiment includes gathering data from usage patterns associated with at least two devices such as a computer and a mobile phone. The method can retrieve data from three or more independent sources as well. Thus, the method can receive and process additional data from an independent source such as a facility (building) access mechanism, lighting data, or an accelerometer on a keyboard, door or chair. The method includes identifying anomalous device use behavior by receiving two, three, or more types of data from two or more sources, such as, for example, one or more of the following: (1) first data from a first device, such as a desktop computer, via a first data path, the first device normally being accessed by a user, (2) second data from a second device, such as a mobile phone, associated with the user via a second data path; and (3) third data from a third data source via a third data path, the third data source being something like a facilities access system or an accelerometer attached to a keyboard or other item. When a comparison indicates an anomaly from the base-line usage data, the system provides a notice that access of the first device is not authorized.

The reference to what the user "normally" does by way of use of a device generally means a device that the user accesses most days or every day at a particular location such as work or home. Many individuals have a work computer that is at a desk or cubicle that they access every day. It may be a laptop that is attached to a docking station or a desktop computer. This term is not limited however to an exclusive device used by only one person. Two people may share a computing device and each "normally" use that device. This term generally means that there is a device that a person uses to the extent that is it expected that is not an anomalous event for them at gain access to the device and use the device, whether they are the only person expected to do so, or whether another person or a group of people can also be expected to access and use the device.

Figure 1:
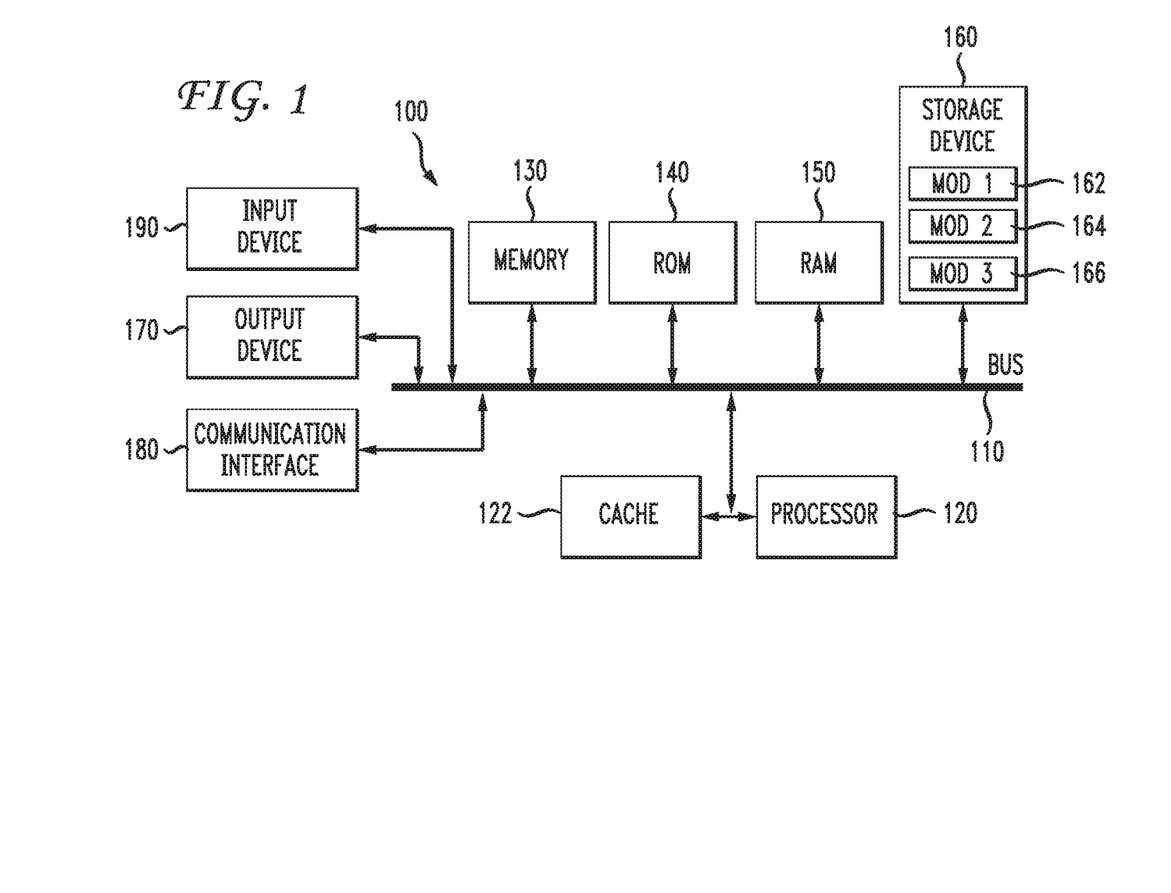
FIG. 1 illustrates an example system embodiment.

A brief introductory description of a basic general purpose system or computing device in FIG. 1 which can be employed to practice the concepts, methods, and techniques disclosed is illustrated. A more detailed description of other embodiments of the unauthorized access detection system and method will then follow.

These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components, including the system memory 130, such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164, and Mod3 166, which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately, however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receives instructions stored in a computer-readable storage device, which cause the processor 120 to perform certain operations. When referring to a virtual processor 120, the system also includes the underlying physical hardware executing the virtual processor 120.

Figure 2:
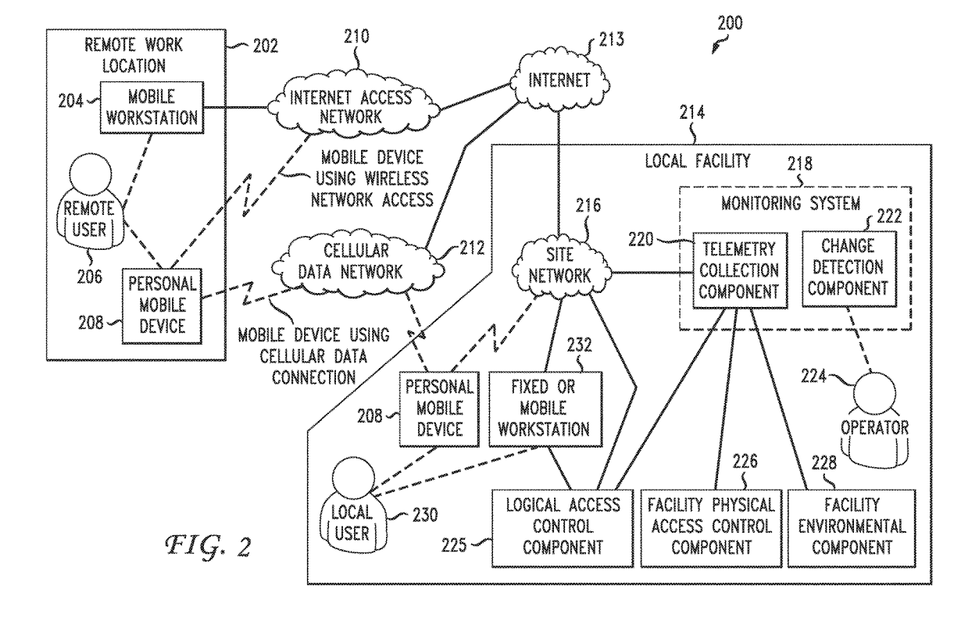
FIG. 2 illustrates a general structure of various devices for use in detecting unauthorized access.

Having disclosed some components of a computing system, the disclosure now turns to FIG. 2, which illustrates a network of devices and systems in which the concepts of this disclosure will operate.

FIG. 2 illustrates an environment 200, which includes two general sub-environments including a remote work location 202 and a local facility 214, which represents a work environment such as an office building.

As is shown, the remote work location 202 includes several devices, including a mobile workstation 204 communicating through a data link to an internet access network 210, which can represent any known access network, such as a local modem and/or router. A mobile personal device 208 can communicate using wireless network access to the internet access network 210, using WIFI or other communication protocols, as well as communicates via a cellular data connection to a cellular data network 212. The remote user 206 is represented as using these two devices. Of course other devices could also be represented and the remote work location 202 can represent any location, not just a work related location. For example, the mobile work station 204 can also represent a desktop computer or a media device, such as Apple TV or other communication device, which communicates with the internet access network 210 or the cellular data network 212. In other words, any device in the remote location 202 can be included. Such devices could also include dishwashers, refrigerators, alarm systems, smoke detectors, systems within automobiles to provide data regarding an automobile location and functionality, and so forth. Any and all of these types of devices can be represented as one of the devices 204, 208. Indeed, part of this disclosure could encompass utilizing data communicated from 2, 3, 4, 5, and/or more different devices or any combination of two or more of any number of devices for purposes of data collection and anomalous activity and access detection. Data from an internet access network 210 and a cellular data network 212 can be communicated to the internet 213 or other communication network as well.

In the local facility 214, the local user 230, which can represent the remote user 206 when the remote user comes to work or can represent another user, has the personal mobile device 208 and a fixed or mobile workstation 232. The person 230 at location 214 generally represents the local user 230 coming to work while carrying his mobile device 208 and utilizing a local fixed or mobile workstation 232 to do his daily work. The mobile personal device 208 can communicate with the cellular data network 212 as well as a local site network 216 via WIFI or some other communication protocol. The fixed or mobile workstation 232 also communicates with the site network 216, which can communicate to the internet 213. A monitoring system 218 is shown having several components. A first feature is a telemetry collection component 220. This component is essentially a data store that receives information from the site network 216. The information received can include data regarding usage of the fixed or mobile workstation 232, the use and location of the personal mobile device 208 as well as other data received via the internet 213, which relates to usage of, the location of, or other data associated with the mobile workstation 204 and the personal mobile device 208, while at the remote work location 202 and/or another location. The component 220 can also receive other data such as usage and location data from any of the other devices, vehicles, appliances, and so forth identified above. The data store in the telemetry collection component 220 can be communicated to or retrieved from a change detection component 222, which stores the logical and analytical engine for determining whether anomalous behavior occurs as shall be described below.

In addition, the local facility 214 can have a facility physical access control component 226 and a facility environmental component 228. These components communicate data to the telemetry collection component 220, as is shown in FIG. 2. The components may also communicate through the site network 216, the cellular network 212 or any other means to communicate data to the telemetry collection components 220.

A local access control component 225 communicates with one or more of the telemetry collection component 220, the fixed or mobile workstation 232, and the network 216. Through the network 216, the logical access control component 225 can also communicate with the mobile workstation 204 and/or the personal mobile device 208. The function of component 225 is similar to the facility physical access control component 226, but the logical access control component 225 is an example of a corporate authentication system in which a username/password, a smartcard, an RSA token, etc., are used for authentication. The user/employee presents credential and authentication information to the logical access control component 225. The logical access control component 225 validates the information and returns a decision to the device (workstation 232 or other device) whether the user is authorized to proceed, or whether the authentication failed (such as with an incorrect password). The component 225 is used in a context of many solely-remote users, and where the system 214 would not have the same type of information stream that it would gain from the facility physical access control component 226.

Figure 3:
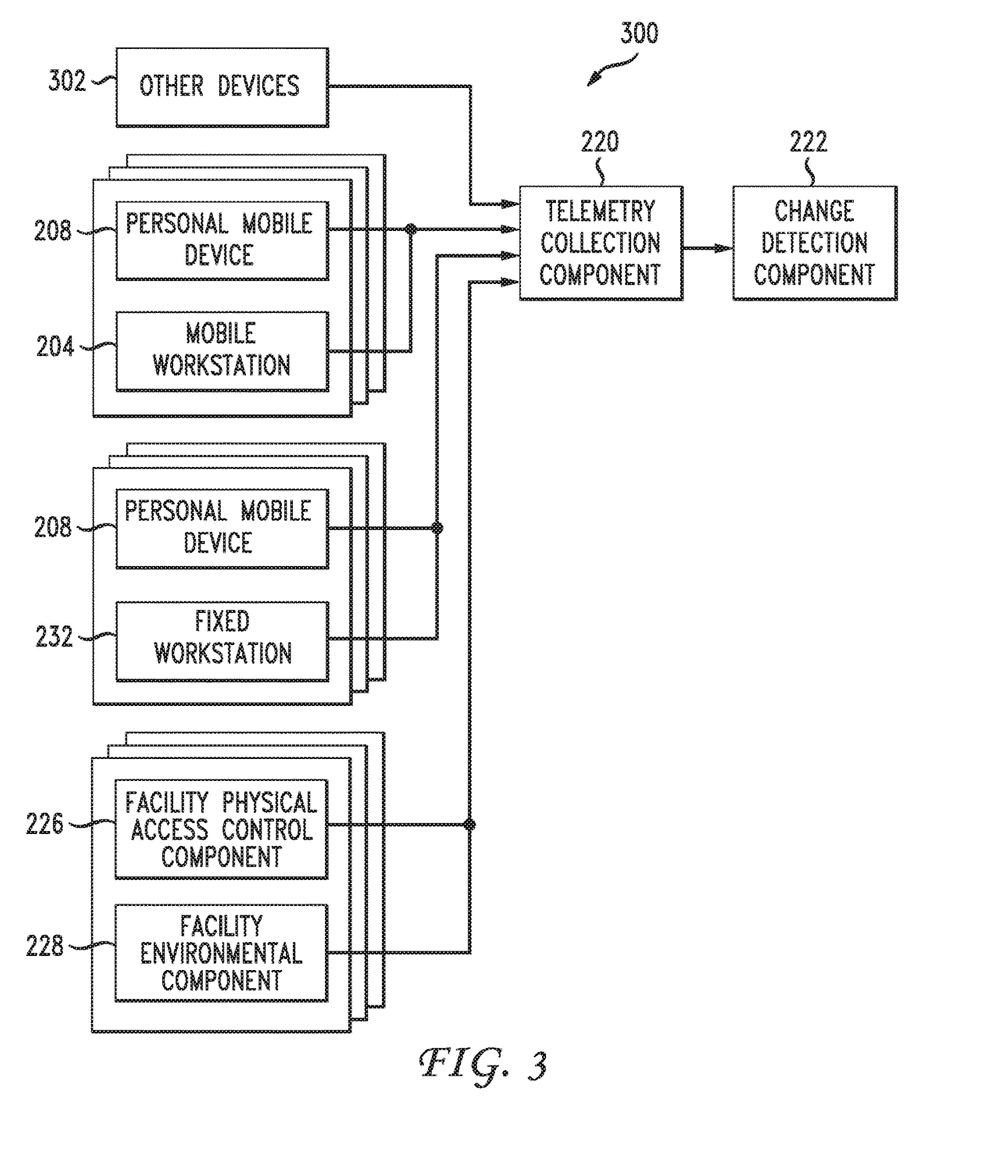
FIG. 3 illustrates a block diagram of a collection and detection system.

FIG. 3 illustrates a simplified version of FIG. 2 and shows a network of devices 300, including the personal mobile device 208 and the mobile workstation 204 that communicates information to the telemetry collection component 220. These generally represent devices that are outside of a work environment or a particularly chosen environment. The personal mobile device 208 and the fixed station 232 are generally represented as being in a particular environment, such as a work environment. In this context, the devices 208/232 also communicate data to the telemetry collection component 220. As is shown in FIG. 3, there can be multiple layers of each of these devices representing different sets of devices for a particular user or multiple users that may be similarly situated.

Also shown in FIG. 3 is a simplified version of the physical access control component 226 and the facility environmental component 228 that each communicate data to the telemetry collection component 220, which then provides the data to the change detection component 222. Also shown in FIG. 3 is an "other devices" 302 representation that illustrates one or more additional devices which also communicates data to the telemetry collection component 220. For example, these devices 302 can represent a device embedded in a vehicle, which reports vehicle usage and location, devices embedded in washers, dryers, toasters, refrigerators, security systems, fire alarms, and so forth. Such devices 302 can also represent sources of information, which may be related to the user 206/230 such as data from a security camera or cameras at traffic lights that may take images of the user's vehicle with license plate identification, and so forth. Thus, the other devices box 302 represents all other data sources as described above as well as any other separate data sources not specifically identified. All of this data is stored in the telemetry collection component 220 for use by the change detection component 222 as shall be described next.

Having discussed the basic environment and devices used according to the principles of this disclosure, as set forth in FIGS. 1, 2, and 3. More specific details regarding the use of information from these various devices in the context of detection of unauthorized access or usage is presented next. It is expected that a software application would be added to the various devices discussed above for the purpose of gathering device status, geo-location, environmental sensor data, and usage/performance data or characterization. Such software can be added via an application that is downloaded or via an operating system. Existing capabilities of the various devices can also be utilized to gather data. The particular manner in which the data is gathered is not relevant to the present disclosure other than to recognize that the data would need to be gathered and then transmitted to a network so that it can ultimately be received at the telemetry collection component 220 and processed by the change detection component 222. The data is useful to discern a legitimate user's authorized actions from unauthorized actions as well as unauthorized access. The unauthorized actions can be by the legitimate user or by an unauthorized party making use of the authorized party's access. For example, an authorized user may legitimately gain access to their workstation 232 at work but then proceed to perform unauthorized operations or access unauthorized files. The basic concepts disclosed herein relate to utilizing the combination of data about the state and usage of two or more devices including. For example, a geo-location of a device such as a cell phone or smartphone can be used, or the operating environment description data for a device, all of which data becomes part of a process to monitor for inappropriate use or unauthorized access. Collecting and analyzing data from various separate data streams without extensive costs is possible and can be cost effective in the manner proposed.

It is noted that the data that can be reported to the telemetry collection component system 220 not only includes data regarding whether a user has accessed the building or a particular room which information can be identified from the facility physical access control component 226, but also includes data from other sensors related to ambient temperature, magnetosphere and compass readings, ambient light level or proximity sensors and so on. This type of data can come from a facility environmental component 228. An example of such usage could be when a user enters a room, the room light level might increase when the user turns on a light or an automatic motion sensor turns on a light. The ambient temperature of the room may go up slightly given the presence of the person 230 in the room. Motion detectors, environment sensors (such as, for example, an accelerometer) can be positioned on a keyboard, a chair or a phone can identify movement or use of these items within the office and such movement and usage can be detected over time to establish a baseline usage. This is, of course, in addition to workstation 232 usage, mobile device 208 usage, and so forth. The system can gather data both from the remote location 202 as well as the local facility 214 and process data from the multiple devices and facility components to establish a baseline pattern of activity for the user 206/230.

In this regard, the system will continually ingest multiple time-series streams of data from the sources identified above related to individual authorized users 230. The data from the individual authorized users' workstations 232, personal mobile devices 208 and use of the facilities 226/228 will be processed in a time-series manner. Over time, these time-based streams can be analyzed and used to establish a particular self-consistency based on a defined rule set and a baseline use of their personal mobile device 208 and the facilities 226/228. One example of baseline usage is the following. Typically, a user's personal mobile device 208 location is going to be within a small distance from a workstation 232 location at any login event. Similarly, the user should be reported and recorded as in a predefined facility 214, which information can be identified via the physical access control system such as a badge reader if the user is working at a location with such a system.

The system disclosed herein can leverage any time-series set sensor readings to assess behavioral patterns. The target sensor readings are those that can be correlated with other independent sensors, such as parallel sensors operating in the same sensing domain. The sensing domain is inferred by location information, from other sensors or pre-defined values (e.g., specific physical location), that fall within that sensor's detection range. A higher number of correlated sensor readings will generally yield better aggregate results to identify potential anomalies.

One authorized user is expected to directly interface with two or more physical devices. Ideally, some or all of the authorized user's activities will occur in a controlled physical facility with additional sensor capabilities.

Some incidental information can be acquired in conjunction with sensor readings, such as amount of available memory, number of Central Processing Units (CPUs or cores), and other "fixed" information. Such information is used to facilitate interpretation of the sensor readings, and is not generally expected to be part of the behavioral analysis parameters.

One physical device, such as a laptop or smartphone, can offer hundreds of discrete sensor sources. Most of these sensors provide an objective measure from discrete hardware components, such as temperature or fan speed. Some "virtual" sensors are established by synthesizing readings from software analysis of activity. For example, a commonly used reading is CPU load. CPU load can be a synthesized value of the discrete usage levels across the multiple individual processors (the CPUs or cores) that in turn include multiple processing pipelines commonly used in parallel.

In one approach of validating the user 230 is at login, when nominal computer checks can occur and run as a background process like many other processes running on the computer. The system will store data from the login event and at some defined period of time the stored data can be transferred to the monitoring system 220. Similar stored data records from the facility component 226 and/or environmental component 228 and/or the personal mobile device 208 can be also sent to the monitoring system 220. When the user 230 accesses the computer 232 with valid credentials a separate post login analysis of the independent streams of data from the personal mobile device 208, the workstation 232, the facility component 226 and the environmental component 228, if applicable, can occur. Any combination of data from these independent streams can also occur. For example, the system may only take data from the facility access control 226 and the workstation 232.

Checks of proximity status with the mobile device 208 are easy to perform and are generally known in the art. The user being in the facility 214 where the user 230 is expected, and carrying the personal mobile device 208 that the user is expected to carry, can be tracked. Furthermore, having time stamps consistent with the user's logical access record will generate a monitoring system confirmation with location consistency.

Other sophisticated checks can also be utilized for some users and can act as finger prints. For example, active external input/output (I/O) ports on the workstation 232 can be compared with keystroke patterns on a keyboard. While no specific data set can be universally defining, many combinations and permutations can be processed and make it very difficult for an illegitimate user to masquerade as the real user. In other words, the basic concept disclosed herein is utilizing these two or more different independent time/spatial data streams to detect illegitimate use or access. An unauthorized party might be able to focus in one aspect of usage and masquerade as the real user. However, deviations from baseline activity in so many different data streams can indicate anomalous activity and make it more difficult for an illegitimate user to masquerade every aspect of data that is collected according to this disclosure. The system 222 can identify deviations from baseline activity in a number of different respects. The system can detect new legitimate activity, a legitimate user conducting unauthorized use, or an unauthorized party making use of the legitimate access (by hiding inside of a legitimate access) or an unauthorized party attempting to be recognized as the legitimate user. Such unauthorized activity can be manifest by detecting differences in explainable inconsistencies from the baseline. Thus, a hostile party attempting to cloak as a legitimate user would need to be aware of, and stay within, the variety of baseline measurements. By requiring multiple devices with independent measurements, geo-location and activity measures, the probability and ability of detecting unauthorized use increases. Therefore, the disclosed system provides a complementary capability to conventional preventative measures, such as multifactor authentication and access control systems. A traditional attack against authentication and monitoring systems is to capture and replay the information stream in an effort to bypass the security checks. An example of this attack is to send a looped video capture to a security camera so that the security monitoring team is unaware of a change in the monitored environment. In the context of the present disclosure, where the attacker is attempting to masquerade as an authorized party, the disclosed techniques will reduce the success rate such an attack. Without the ability to replay the data synchronously across all the input streams, the disclosed techniques will identify the anomaly. These disclosed techniques can still work even when other authentication and data integrity practices, such as multifactor authentication and cryptographically protected data connections, are bypassed.

Because the consistency checks can use almost any internal data from any of the components (i.e., workstations 232, personal mobile devices 208, facilities 226), the specifics of any analysis tool can vary. As is shown in FIG. 2, much of the data will be from the workstation 232 but the personal mobile devices 208 all offer much data as well. The data transmission path from the workstations 232 and the personal mobile devices 208 should be as diverse as possible to the monitoring system 218 to maximize the utility of collaborating data from the two or more separate inputs to the monitoring system 218.

Over time, the user 230 will generally exhibit consistent activity, including changes in work assignments and so forth. In this regard, an operator 224 may provide data which suggests a change in consistent activity. For example, if an employee 230 gets a new work assignment, the operator 224, or other source of change, can provide data identifying the new change to monitoring system 218 so that what otherwise might look like anomalous activity is recognized as potentially being expected given a change in a work assignment.

As identified by a series of measures from the various discrete devices, an activity profile can be established and deviations from that profile identified for further review or generating an alert to the operator 224.

In one aspect, the workstation 232 will include a new background process, or new software on the computer, that collects the data representing the workstation inputs to the monitoring system, and via some connectivity the data is transported to the monitoring system 218. The environmental sensors associated with the facility environmental component 228 can also be provided. Internal usage/characterization data, such as processor performance in the workstation 232, I/O activity (e.g., keyboard usage, storage access, and so forth), can be provided. Other data, such as chair motion usage, phone usage, and so forth, can be provided such that such process or thread information relating to ongoing software activity can be captured at regular time intervals. The time intervals for these data captures are calibrated to minimize or reduce the impact of the measurement activity on the device as nominal performance.

In one aspect, it is noted that the timing of reporting of usage can vary for various devices such as the workstation 232, mobile device 208, facility environmental component 228, and so forth. However, in one aspect, if a potential anomaly appears to be detected by the monitoring system 218, the system 218 can report back to the software on the various devices such that a coordination of the timing of reports can increase or be coordinated. Thus, depending on the type of anomaly suggested, the monitoring system 218 may signal the workstation 232 and/or the software on the mobile device 208 to start to increase their reporting frequency to once every half second (or whatever interval might be appropriate from, for example, once every microsecond, to once every minute or once every half hour, and so forth). Similarly, the monitoring system could recognize that the anomalous data is coming from one of the plurality of devices from which data is received and the monitoring system could increase the frequency of reporting from that device while leaving unchanged, reducing, or partially increasing the reporting of the second device. Thus, where the normal reporting interval might be calibrated to minimize the impact of the measurement activity on the device performance, when an anomaly is detected, the system may increase that detection activity, even if it affects the performance of the device. Furthermore, the monitoring system may desire to increase the reporting activity in such a way that might be undetected by the potential attacker. Thus, not only will the monitoring system increase the reporting performed by the software on the device with the suspicious activity, but also the monitoring system could instruct such a device to alter other software usage, such that the performance of the device does not change. Other approaches might be implemented, such as changing a clock speed or power usage to mask the increase or change in detection activity from the attacker. In other words, the monitoring system might recognize that a potential attacker is participating in a particular activity and unlikely to detect that a separate background process is wound down or turned off such that the monitoring background process, when it increases its frequency of reporting data, does not affect the overall performance of the device. Thus, the potential attacker may not recognize that increased reporting is occurring of his or her activity, and thus, the monitoring system 218 might be able to detect the illegitimate activity without revealing its detection.

A custom software application can be provided to the personal mobile device 208 in a similar application on the workstation 232. Such application provides a self-registration capability, a start/stop function, and an ongoing collection and reporting function of the various data, such as geo-location, environmental, and/or usage. The application can also provide a unique identifier to the monitoring system 218 and employee identifier which can be provided by the employee 230. The personal mobile device software can transmit accrued information via a cellular network or a wireless network connection, whichever is available or accessible. The data can also be transmitted across the internet 212 or any other communication network, to the monitoring system 218. The workstation 232 transmits the information to the monitoring system typically through available network access 216 which can be a local area network or the Internet 213 as well as potentially through a cellular network 212, which would be on a discrete path separate from any cellular usage of the mobile device 208. The workstation 232 can also communicate through a wireless network or a wired network.

The monitoring system 218 records each separate stream, including origin information, in the telemetry collection component 220. The telemetry collection component 220 uses commodity data storage systems, which are prepared for the quantity and variety of data. The origin information identifies whether a commodity cellular network carrier, commodity network access, or local access network was used to transmit the information. The origin identification information is obtained through a fixed lookup table based on public or employee-reported information, or a commodity service. For each user 230 that accesses their system 232, the monitoring system 218 will compare the information from at least two time-data streams. The sources of the at least two time-data streams can include the personal mobile device 208, the facilities access component 226, the environmental component 228, or other data sources such as an environment sensor. Non-limiting examples of such environment sensors include accelerometers on a chair, a telephone handset, a mouse, or touch mouse pad or a keyboard that reports key-press activity or other usage, and so forth. The streamed information is automatically compared to prior time periods and between streams. The historical information compares and identifies whether a shift in behavior has occurred. Intrastream data can also be used to further refine the expected behavior patterns.

Geo-location information can be used between streams to determine whether the two devices, such as the workstation 232 and the personal mobile device 208 are in a recognized geographic configuration, such as proximate within a particular threshold. The system may identify that the user 230 typically places the personal mobile device 208 to the right of the workstation 232 when the user arrives at work. Thus, if potential anomalous activity is detected on the workstation 232, the system might detect that the personal mobile device 208 is placed on the left of the workstation 232 that day and this anomaly might heighten the potential that anomalous activity is occurring. Thus, if the workstation 232 and the personal mobile device 208 are outside of a recognized configuration or arrangement, an alert can be generated or it may be determined that this by itself is not sufficiently unique to justify sending an alert. Geo-location is generally limited to GPS quality, and is, thus, in the range of approximately 10 m. Other systems use GPS for the "geo-fencing" concept to alert when a device enters or leaves a defined area within the available tolerance of GPS. GPS supplements, such as high-sensitivity receivers and knowledge of physical reference points, can improve the accuracy to a few feet. Newer chipsets for internal positioning systems (such as Near Field Communication (NFC) or Apple iBeacon positioning systems) can enable ultra high-precision location information. The concepts and systems disclosed herein contemplate utilizing whatever granularity is capable for location-based services as part of the data that is analyzed to detect anomalies.

The facilities data from devices 226 and 228 can also be provided to the monitoring system 218. This data relates to building access, lighting usage, and temperature. All this data can be informative as to whether or not a workstation activity is valid. An artificial transient signal can be injected as a calibration point into any of the data streams. For example, a local cell tower repeater or even a GPS signal repeater can be momentarily (such as in seconds or minutes) turned off to lower the expected performance of the cell phone and or smartphone geo-location thus altering data in the phone reporting to the monitoring system. Correlation of the artificial transient signals at random timings will make it very difficult for an unauthorized user to fake signal content remotely. If the unauthorized user is embedded inside the user computer and needs to fake data to hide the unauthorized activity, then the faked reporting will need to be self-consistent with the environment (which can be randomly altered).

A unique aspect of the system is the ongoing integrated collection, correlation, and analysis of the multiple location and activity streams for the purposes of defining authorized legitimate computer use versus anomalous behavior.

Figure 4:
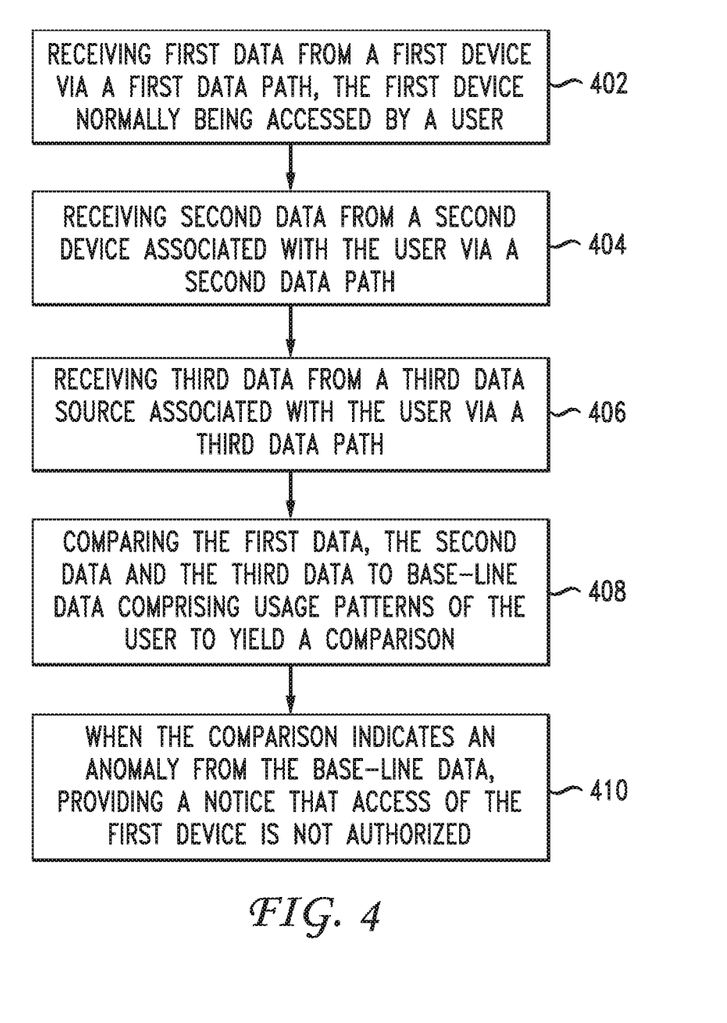
FIG. 4 illustrates a method embodiment.

FIG. 4 illustrates a method embodiment of identifying anomalous device use or access. The method includes receiving first data from a first device via a first data path, the first device normally being accessed by a user (402), receiving second data from a second device associated with a user via a second data path (404). The method further includes receiving optional third data from a third data source associated with the user via a third data path (406) and comparing the first data, the second data and the optionally the third data to base-line data comprising usage pattern of the user to yield a comparison (408). Finally, when the comparison indicates an anomaly from the base-line data, the method includes providing a notice that access to the first device is not authorized.

Other actions can be taken too, such as changing the environment to test whether the user is the authorized. For example, if the authorized user has a habit, when the lights turn off in his office (for example, when no movement is detected for a period of time) to turning the lights back on, then the system could initiate turning the lights off (as though no movement was detected) to see if the user in question exhibits the same behavior of turning the lights back on. This test could include presenting something on the computer, such as an email notice, a meeting notice, or other activity that is presented to the questionable user to detect the questionable user's response. The response can be further evidence of an inappropriate user.

As noted above, the independent sources can be two or more. Thus, while FIG. 4 illustrates a third data source, it is contemplated that the comparison may only compare data from a first data source and a second data source via independent data paths. The data, whether it is the first data, second data, or third data, can be location data of the respective device. Also, any of the data that can be derived from an environmental sensor such as, for example, an accelerometer connected to a keyboard, a phone, a chair, a mouse, and/or a door. Furthermore, any one of the first data, the second data, and the third data can include one of temperature data, a magnetosphere reading, a compass reading, a light level, a proximity sensor reading, a keycard access reading, device performance data, image data, keyboard data, rate of change of any of these parameters, location data, software usage data, elevation data, social media data, weather data, responsive actions to test activities produced by the system, and device internal functionality data. The base-line data that is discussed above can be data of usage patterns of the particular individual or of usage patterns of individuals in a same category as the user. For example, the user may be part of a team or be at a certain level within a company and the usage patterns that might be identified might be not only the usage pattern of the individual user but those of the team who are essentially working on the same project and/or perhaps working in the same facility or the same set of cubicles or the same set of offices. Therefore, the base-line data that is used in the comparison might be not of a single individual but of similarly situated individuals.

The comparison may indicate an anomaly at different levels. For example, there potentially could be a low threshold, which would indicate that a potential anomaly or unauthorized access is beginning. At this stage, the comparison may not indicate at a higher threshold that there is a high enough confidence level that an actual unauthorized access is occurring. The standard approved user may be performing an authorized activity that may for some reason indicate anomalous activity but is a false alarm. However, if there is a threshold where a potential anomaly appears to exist, the system could transmit instructions to one of a first application, a second application or a third application on the respective devices to adjust a timing of reporting of its data. A test action could be presented by the system to detect whether the user response is related to a base-line response or different. The timing could include an increased number of reports of the data for any one or more of the devices. Furthermore, the timing instruction could include adjustments up or down of one or more of the devices in order to gather more necessary data quickly to determine whether the potential anomaly might rise to the level of an actual anomaly and thus trigger the appropriate notice.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM, or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, measurements from various other types of data sources can be included within the analysis. Virtual optical and acceleration measurements of keystrokes or chair movement, for example, can be provided. The number of different data streams can be two, three, four, five, or more depending on the necessary circumstances. As noted above, a "processor" can be part of essentially any kind of device such as a refrigerator, a copier, a wearable device such as a watch, hearing aid, pacemaker, jewelry, etc. Furthermore, a device can be an enclosure such as a room, which "device" can have more than one reporting pathway. The boundary of a device or an enclosure is a data stream or a processor and the reporting pathways represent the boundary of a device or enclosure. Claim language reciting "at least one of" a set indicates that one member of the set or multiple members of the set satisfy the claim.

The invention claimed is:

1. A method of identifying anomalous device behavior or potential anomalous device behavior, the method comprising:
    receiving first data from a first device via a first data path, the first device is being accessed by a user, a first application on said first device gathers and transmits said first data;
    receiving second data from a second device associated with the user via a second data path, a second application on said second device gathers and transmits said second data;
    receiving third data from a third data source associated with the user via a third data path;
    comparing the first data, the second data and the third data to base-line data comprising usage patterns of the user to yield a comparison;
    when the comparison indicates a potential anomaly, one of said first application and said second application adjusts timing of the gather and transmit of said first data or said second data, respectively; and
    when the comparison indicates an anomaly from the base-line data, providing a notice that one of access or use of the first device is not authorized,
    wherein the first data path, the second data path, and the third data path are independent data paths from each other such that each said device is isolated from each other device and each said device has a different data path, respectively.

2. The method of claim 1, wherein the first device is a computer, the second device is a mobile device and the third data source is a facilities-based source.

3. The method of claim 1, wherein the second data is location data of the second device.

4. The method of claim 1, wherein the third data is derived from an environment sensor connected to one of a keyboard, a phone, a chair, a mouse, and a door.

5. The method of claim 1, wherein one of the first data, the second data and the third data comprises one of temperature data, a magnetosphere reading, a compass reading, a light level, a proximity sensor reading, a keycard access reading, device performance data, image data, keyboard data, rate-of-change data, location data, software usage data, elevation data, social media data, weather data, and device internal functionality.

6. The method of claim 1, wherein the base-line data further comprises data of usage patterns of other individuals in a same category as the user.

7. The method of claim 1, wherein the timing comprises an increased number of reports of the data.

8. The method of claim 1, wherein the usage patterns relate to usage, by the user, of the first device, the second device and the third data source.

9. A system of identifying anomalous device behavior or potential anomalous device behavior, the system comprising:
    a processor; and
    a computer-readable storage device storing instructions which, when executed by the processor, cause the processor to perform operations comprising:
    receiving first data from a first device via a first data path, the first device is being accessed by a user, a first application on said first device gathers and transmits said first data;
    receiving second data from a second device associated with the user via a second data path, a second application on said second device gathers and transmits said second data;
    receiving third data from a third data source associated with the user via a third data path;
    comparing the first data, the second data and the third data to base-line data comprising usage patterns of the user to yield a comparison;
    when the comparison indicates a potential anomaly, one of said first application and said second application adjusts timing of the gather and transmit of said first data or said second data, respectively; and when the comparison indicates an anomaly from the base-line data, providing a notice that one of access of or use of the first device is not authorized, wherein the first data path, the second data path, and the third data path are independent data paths from each other such that each said device is isolated from each other device and each said device has a different data path, respectively.

10. The system of claim 9, wherein the first device is a computer, the second device is a mobile device and the third data source is a facilities-based source.

11. The system of claim 9, wherein the second data is location data of the second device.

12. The system of claim 9, wherein the third data is derived from an environment sensor connected to one of a keyboard, a phone, a chair, a mouse, and a door.

13. The system of claim 9, wherein one of the first data, the second data and the third data comprises one of temperature data, a magnetosphere reading, a compass reading, a light level, a proximity sensor reading, a keycard access reading, device performance data, image data, keyboard data, rate-of-change data, location data, software usage data, elevation data, social media data, weather data, and device internal functionality.

14. The system of claim 9, wherein the base-line data further comprises data of usage patterns of other individuals in a same category as the user.

15. A computer-readable storage device storing instructions which, when executed by a computing device, cause the computing device to perform operations comprising:

receiving first data from a first device via a first data path, the first device is being accessed by a user, a first application on said first device gathers and transmits said first data;

receiving second data from a second device associated with the user via a second data path, a second application on said second device gathers and transmits said second data;

receiving third data from a third data source associated with the user via a third data path;

comparing the first data, the second data and the third data to base-line data comprising usage patterns of the user to yield a comparison;

when the comparison indicates a potential anomaly, one of said first application and said second application adjusts timing of the gather and transmit of said first data or said second data, respectively; and when the comparison indicates an anomaly from the base-line data, providing a notice that one of access of or use of the first device is not authorized, wherein the first data path, the second data path, and the third data path are independent data paths from each other such that each said device is isolated from each other device and each said device has a different data path, respectively.

* * * * *

UNITED STATES PATENT AND TRADEMARK OFFICE
CERTIFICATE OF CORRECTION

PATENT NO. : 9,749,342 B1
APPLICATION NO. : 15/281988
DATED : August 29, 2017
INVENTOR(S) : Frederic J. Krage et al.

It is certified that error appears in the above-identified patent and that said Letters Patent is hereby corrected as shown below:

On the Title Page

Item (72) Inventor "Frederick J. Krage" should be changed to "Frederic J. Krage".

Signed and Sealed this
Ninth Day of October, 2018

Andrei Iancu
*Director of the United States Patent and Trademark Office*